(12) United States Patent
Kang et al.

(10) Patent No.: US 12,130,600 B2
(45) Date of Patent: Oct. 29, 2024

(54) HETEROGENEOUS TEST EQUIPMENT INTERFACING APPARATUS FOR WEAPON SYSTEM ENVIRONMENT/RELIABILITY TEST, ENVIRONMENT TEST SYSTEM, AND DATA INTERMEDIATE APPARATUS

(71) Applicant: AGENCY FOR DEFENSE DEVELOPMENT, Daejeon (KR)

(72) Inventors: Tae yeob Kang, Daejeon (KR); Donghwan Seo, Daejeon (KR); Hyeyoung Min, Daejeon (KR); Joonki Min, Daejeon (KR); Soohyeong Kim, Daejeon (KR); Jeongsoo Nam, Daejeon (KR); Sangbok Song, Daejeon (KR); Kisung Cho, Daejeon (KR); Sangwoon Lee, Daejeon (KR); Youngsoo Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 370 days.

(21) Appl. No.: 17/505,385

(22) Filed: Oct. 19, 2021

(65) Prior Publication Data
US 2022/0221829 A1 Jul. 14, 2022

(30) Foreign Application Priority Data
Oct. 20, 2020 (KR) .......................... 10-2020-0135866

(51) Int. Cl.
*H04W 8/26* (2009.01)
*G05B 15/02* (2006.01)
(Continued)

(52) U.S. Cl.
CPC ............ *G05B 15/02* (2013.01); *G06F 11/263* (2013.01); *G06F 11/2733* (2013.01);
(Continued)

(58) Field of Classification Search
CPC ......... G05B 15/02; G05B 17/02; G06F 11/00; G06F 8/71; G06F 8/43; G06F 8/73;
(Continued)

(56) References Cited

U.S. PATENT DOCUMENTS

| 5,762,747 A | 6/1998 | Park et al. |
| 6,842,022 B2 * | 1/2005 | Khoche ............ G01R 31/31707 324/754.03 |

(Continued)

FOREIGN PATENT DOCUMENTS

| JP | 2006-215036 | 8/2006 |
| JP | 2009-80068 | 4/2009 |

(Continued)

OTHER PUBLICATIONS

Office Action of Korean application No. 10-2020-0135866 dated Nov. 23, 2020 with the English translation provided by the foreign associate.

(Continued)

*Primary Examiner* — Man U Phan
(74) *Attorney, Agent, or Firm* — Ladas & Parry, LLP

(57) ABSTRACT

One or more embodiments provide a heterogeneous test equipment interfacing apparatus. The heterogeneous test equipment interfacing apparatus includes a plurality of data intermediate apparatuses connected to a plurality of environment test chambers; and at least one computer apparatus interoperating with the plurality of data intermediate apparatuses. Each of the plurality of data intermediate apparatuses is configured to convert an electric signal received from at least one environment test chamber interoperating with a corresponding data intermediate apparatus from among the plurality of environment test chambers into a data signal based on an SNMP protocol, output the data signal and, output a control signal for controlling the at least one (Continued)

environment test chamber interoperating with a corresponding data intermediate apparatus according to an operation control instruction received from the at least one computer apparatus.

14 Claims, 8 Drawing Sheets

(51) Int. Cl.
    *G06F 11/263*     (2006.01)
    *G06F 11/273*     (2006.01)
    *H04L 12/46*     (2006.01)
    *H04L 41/0213*     (2022.01)

(52) U.S. Cl.
    CPC .......... *G06F 11/2736* (2013.01); *H04L 12/46* (2013.01); *H04L 41/0213* (2013.01)

(58) Field of Classification Search
    CPC . G06F 9/44; G06F 11/22; G06F 11/27; G06F 11/26; G06F 9/45; G06F 16/22; G06F 21/57; G06N 20/00; H04W 8/26; H04W 24/02; H04W 24/04; H04W 24/08; H04W 12/06; H04W 12/08; H04W 12/12; H04W 28/18; H04W 52/36; H04W 12/10; H04W 28/08; H04B 17/24; H04B 17/39
    USPC ......................................................... 370/467
    See application file for complete search history.

(56) References Cited

U.S. PATENT DOCUMENTS

| | | | | |
|---|---|---|---|---|
| 7,373,403 B2* | 5/2008 | Kroboth | ................. | G08C 15/06 709/224 |
| 7,423,444 B2 | 9/2008 | Jang et al. | | |
| 7,958,230 B2* | 6/2011 | Guruswamy | ....... | H04L 63/0823 709/224 |
| 8,433,811 B2* | 4/2013 | Guruswamy | ....... | H04L 63/0823 709/224 |
| 8,978,081 B2* | 3/2015 | McClay | ............... | H04N 17/004 348/181 |
| 9,026,558 B2* | 5/2015 | Dunkle | .............. | G05B 19/4183 700/121 |
| 9,367,056 B2* | 6/2016 | Park | ....................... | G05B 15/02 |
| 9,424,169 B1* | 8/2016 | Galburt | ............... | G06F 11/3688 |
| 9,628,356 B2* | 4/2017 | Gintis | .............. | G01R 31/31855 |
| 9,659,045 B2* | 5/2017 | Liu | ......................... | G06F 16/20 |
| 10,571,874 B2* | 2/2020 | Namie | ................... | G05B 19/19 |
| 11,385,889 B2* | 7/2022 | Fender | ..................... | G06F 8/71 |
| 11,423,001 B2* | 8/2022 | Liu | ..................... | G06F 11/3409 |
| 11,520,688 B1* | 12/2022 | Poirier | ............... | G06F 11/3688 |
| 11,537,485 B2* | 12/2022 | Tsai | ..................... | G06F 11/2736 |
| 11,552,874 B1* | 1/2023 | Pragada | .................. | H04L 43/08 |
| 2004/0039812 A1* | 2/2004 | Connelly | ............ | H04M 3/2227 709/224 |
| 2010/0161306 A1* | 6/2010 | Burgun | ................. | G06F 11/261 703/20 |
| 2015/0212834 A1* | 7/2015 | Lee | ..................... | G06F 9/44526 719/327 |
| 2023/0096734 A1* | 3/2023 | Anthonappa | ......... | G06F 11/263 714/33 |

FOREIGN PATENT DOCUMENTS

| | | |
|---|---|---|
| KR | 0174619 | 4/1997 |
| KR | 2000-0050044 | 8/2000 |
| KR | 10-0363228 | 12/2002 |
| KR | 10-2005-0079663 | 8/2005 |
| KR | 10-0625427 | 9/2006 |
| KR | 10-2011-0124034 | 3/2012 |
| KR | 10-1729694 | 4/2017 |
| KR | 10-2020-0114193 | 10/2020 |

OTHER PUBLICATIONS

Notice of Allowance of Korean application No. 10-2020-0135866 dated Feb. 1, 2021 with English translation provided by Google Translate.

\* cited by examiner

FIG. 4

```
OLZETEK-MIB DEFINITIONS : : = BEGIN

IMPORTS
    OBJECT-TYPE, MODULE-IDENTITY, Integer32, enterprises
        FROM SNMPv2-SMI
    DisplayString
        FROM SNMPv2-TC;

olzeMIB MODULE-IDENTITY
    LAST-UPDATED "20190613"
    ORGANIZATION "olzetek"
    CONTACT-INFO "olzetek"
    REVISION "20190613"
    DESCRIPTION "olzetek mib"
    : : = {enterprises 49921} outlet1Status OBJECT-TYPE
    SYNTAX INTEGER {off(1), on(2), pending(3), reboot(4)}
    ACCESS read-write
    STATUS mandatory
    DESCRIPTION
        "Display and control outlet 1 status. Cant't set pending status."
    : : = {olzeMIB 1} outlet2Status OBJECT-TYPE
    SYNTAX INTEGER {off(1), on(2), pending(3), reboot(4)}
    ACCESS read-write
    STATUS mandatory
    DESCRIPTION
        "Display and control outlet 2 status. Cant't set pending status."
    : : = {olzeMIB 2}
```

HETEROGENEOUS TEST EQUIPMENT INTERFACING APPARATUS FOR WEAPON SYSTEM ENVIRONMENT/RELIABILITY TEST, ENVIRONMENT TEST SYSTEM, AND DATA INTERMEDIATE APPARATUS

CROSS-REFERENCE TO RELATED APPLICATION

This application is based on and claims priority under 35 U.S.C. § 119 to Korean Patent Application No. 10-2020-0135866, filed on Oct. 20, 2020, in the Korean Intellectual Property Office, the disclosure of which is incorporated by reference herein in its entirety.

BACKGROUND

1. Field

One or more embodiments relate to a heterogeneous test equipment interfacing apparatus, a data intermediate apparatus, and an environment test system, and more particularly, to a heterogeneous test equipment interfacing apparatus for testing weapon system environment/reliability, an environment test system including the same, and a data intermediate apparatus interoperating with an old environment test chamber using electric signals only.

2. Description of the Related Art

Most automation and process control systems have distributed structures, and efficient data communication between distributed equipment in a system influences process control performance. Various types of communication protocols have been proposed for the satisfaction of real-time processing performance demanded by such industrial networks, and standardization has been requested for compatibility between devices using different communication protocols. Currently, international standards related to industrial networks are implemented by two agencies, that is, International Organization for Standardization (ISO) and International Electrotechnical Commission (IEC). For mutual cooperation, the IEC is working on electricity, electronic, and information technology fields, and the ISO is working on other fields like industrial automation systems. Recently, IEC TC65 and IEC61158 have been announced by the two agencies as the latest industrial network standards, wherein IEC TC65 and IEC61158 include PROFIBUS, ControlNet, Foundation, Fieldbus, Interbus, Swiftnet, Wordlfip, P-Net, FF HSE, etc. The field bus standards were published as official international standards through continuous discussions.

As such, the standardization of network and hardware fields are actively performed (e.g., a fieldbus) and almost completed, while the standardization of the process data for efficient information exchange between measuring instruments and control systems that is essential in order to improve the quality of industrial products has not reached the above level. For the standardization and the management of distributed equipment, there is a method of managing state information through a network by using a simple network management protocol (SNMP). However, the method has a disadvantage in that there are limits in expandability and efficiency, and, since the method is a standard technique of the network field, a separate data representation is needed for application to a measuring instrument. In another example, there is a method of providing a service by implementing a built-in web server. However, since the HTML, which is the basis of a web service, is a presentation-oriented language, the HTML is not suitable to be applied to measuring instrument information, which is data-oriented.

There are services like a digital home theater service that connects equipment through a high-speed communication network for interoperation with one another and an Internet extension service that extends services inside a home network to the outside through the Internet. However, these services have clearly different characteristics in terms of equipment operation characteristics, fields of application, and service quality, protocols used therefor and methodologies for development thereof differ. Therefore, in order to establish a home network with the current technology, at least two or more heterogeneous sub-networks need to be established. One of such sub-networks is a control network for home automation service, and LonTalk may be the most representative protocol therefor. In particular, the LonTalk establishes an open and unique distributed control network, and many practical products are being produced by the LonMark, which is a group of product manufacturing companies. The other one of such sub-network is a data network, wherein an audio/video network based on an IEEE protocol including TCP/IP functions and using a broadband communication medium from 100 Mbps to 3.2 Gbps corresponds to the data network. Many researches are being made on such a data network, including middleware standards like Havi, Vesa, and UPnP. Although networks with different fields of applications and research and development systems have been pursuing their own researches and developments until now, the need for interoperation between each other in a home network has been proposed, and a middleware structure supporting a flexible interoperation without hindering the characteristics of protocols and services of respective networks is demanded. To resolve the problem, a middleware structure capable of first analyzing characteristics of protocols for a data network and a control network and supporting a flexible interoperation therebetween based on the analysis is demanded.

SUMMARY

One or more embodiments include a heterogeneous test equipment interfacing apparatus for testing weapon system environment/reliability, an environment test system, and a data intermediate apparatus.

One or more embodiments include a middleware structure capable of first analyzing characteristics of protocols for a data network and a control network and supporting a flexible interoperation therebetween based on the analysis.

One or more embodiments include hardware design specifications, software design specifications, and communication interface design specifications for heterogeneous test equipment interfacing apparatus, a data intermediate apparatus, and an environment test system.

Additional aspects will be set forth in part in the description which follows and, in part, will be apparent from the description, or may be learned by practice of the presented embodiments of the disclosure.

According to one or more embodiments, a heterogeneous test equipment interfacing apparatus includes a plurality of data intermediate apparatuses connected to a plurality of environment test chambers; and at least one computer apparatus interoperating with the plurality of data intermediate apparatuses. Each of the plurality of data intermediate apparatuses is configured to convert an electric signal received from at least one environment test chamber interoperating with a corresponding data intermediate apparatus from among the plurality of environment test chambers into a data signal based on an SNMP protocol, output the data signal and, output a control signal for controlling the at least one environment test chamber interoperating with a corresponding data intermediate apparatus according to an operation control instruction received from the at least one computer apparatus.

The at least one computer apparatus may be configured to execute a plurality of commonization daemons, which are executable as a single process on a single computer or executable on a multiple computers in correspondence to the plurality of data intermediate apparatuses; an abstract interface configured to implement an input interface of a corresponding commonization daemon from among the plurality of commonization daemons to receive the data signal from a corresponding data intermediate apparatus from among the plurality of data intermediate apparatuses and to implement a modified interface according to heterogeneous digital interfaces; and a common interface configured to implement an output interface of a commonization daemon from among the plurality of commonization daemons, generate chamber data of the environment test chamber according to the data signal received from the abstract interface as common data in a JSON format, and transmits the common data to a storage interface and a distribution interface.

The common interface may determine whether the common data is first common data in an SQL/JSON format or second common data in an UDP/JSON format, by interoperating with an environment test big data DB and an environment test post-analysis application by using the first common data in the SQL/JSON format, store the first common data in the environment test big data DB through the storage interface, and, by interoperating with environment test monitoring applications by using the second common data in the UDP/JSON format, transmit the second common data to the environment test monitoring application.

The plurality of environment test chambers connected to the plurality of data intermediate apparatuses may be weapon system environment test chambers having analog interfaces, wherein at least some of the environment test chambers may be of different types.

At least some of the plurality of commonization daemons may be of different types in correspondence to the plurality of environment test chambers.

Some of the plurality of commonization daemons may be directly coupled to the environment test chambers through digital interfaces without a data intermediate apparatus.

Each of the data intermediate apparatuses may include a plurality of input terminals connected to the at least one environment test chamber interoperating with; a plurality of input relays configured to convert electric signals received from the plurality of input terminals into signals of a pre-set voltage level; an MCU configured to convert the signals of the pre-set voltage level into the data signal based on the SNMP protocol; and a communication unit configured to output the data signal.

Each of the data intermediate apparatuses may include a plurality of output relays configured to convert a control signal output from the MCU into a direct current (DC) control signal; and a plurality of output terminals configured to output the DC control signal to the at least one environment test chamber interoperating with.

Each of the data intermediate apparatuses may further include an alternating current (AC) output relay configured to convert the DC control signal into an AC control signal. The AC control signal may be output to the at least one environment test chamber interoperating with through the plurality of output terminals.

The MCU may include GPIs and GPOs respectively corresponding to the plurality of input terminals and the plurality of output terminals and store input port information and output port information for mapping the GPIs and the GPOs to points of the at least one environment test chamber interoperating with.

The MCU may be configured to execute an SNMP manager based on a common MIB.

According to one or more embodiments, an environment test system includes a plurality of environment test chambers, wherein at least some of the plurality of environment test chambers are of different types; a heterogeneous test equipment interfacing apparatus of any one of claims 1 to 10 connected to the plurality of environment test chambers; and an operating computer apparatus configured to receive an operation control of a user and, according to the operation control of the user, execute a management application providing operation control instructions to the heterogeneous test equipment interfacing apparatus to control the plurality of environment test chambers.

The operating computer apparatus may include an operation pattern big data storage configured to store operation control data in which operation controls received from the user are recorded; and a machine learning model trained to determine whether an operation control of the user corresponds to a normal pattern by using the operation control data.

The management application may be configured to inquire an operation control of the user to the machine learning model, receive pattern information from the machine learning model, and, when the pattern information indicates an abnormal pattern, output a warning sign.

The machine learning model may be a decision tree model.

According to one or more embodiments, a data intermediate apparatus includes a plurality of input terminal configured to receive electric signals from an environment test chamber; a plurality of input relays configured to convert the electric signals received from the plurality of input terminals into signals of a pre-set voltage level; an MCU configured to convert a signal of the pre-set voltage level into a data signal and generate a control signal based on an operation control instruction received from the outside; a plurality of output relays configured to convert a control signal generated by the MCU into a direct current (DC) control signal; a plurality of output terminals configured to output the DC control signal to the environment test chamber; and a communication unit configured to output the data signal and receive the control signal.

The data intermediate apparatus may further include an alternating current (AC) output relay configured to convert the DC control signal into an AC control signal. The AC control signal may be output to the environment test chamber through the plurality of output terminals.

The MCU may include GPIs and GPOs respectively corresponding to the plurality of input terminals and the plurality of output terminals and store input port information and output port information for mapping the GPIs and the GPOs to points of the environment test chamber interoperating with.

The plurality of input relays and the plurality of output relays may be photo-coupler type relays.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 shows program codes indicating types and states of objects related to items of the common MIB based on which a data intermediate apparatus according to one or more embodiments operates.

DETAILED DESCRIPTION

Figure 1:
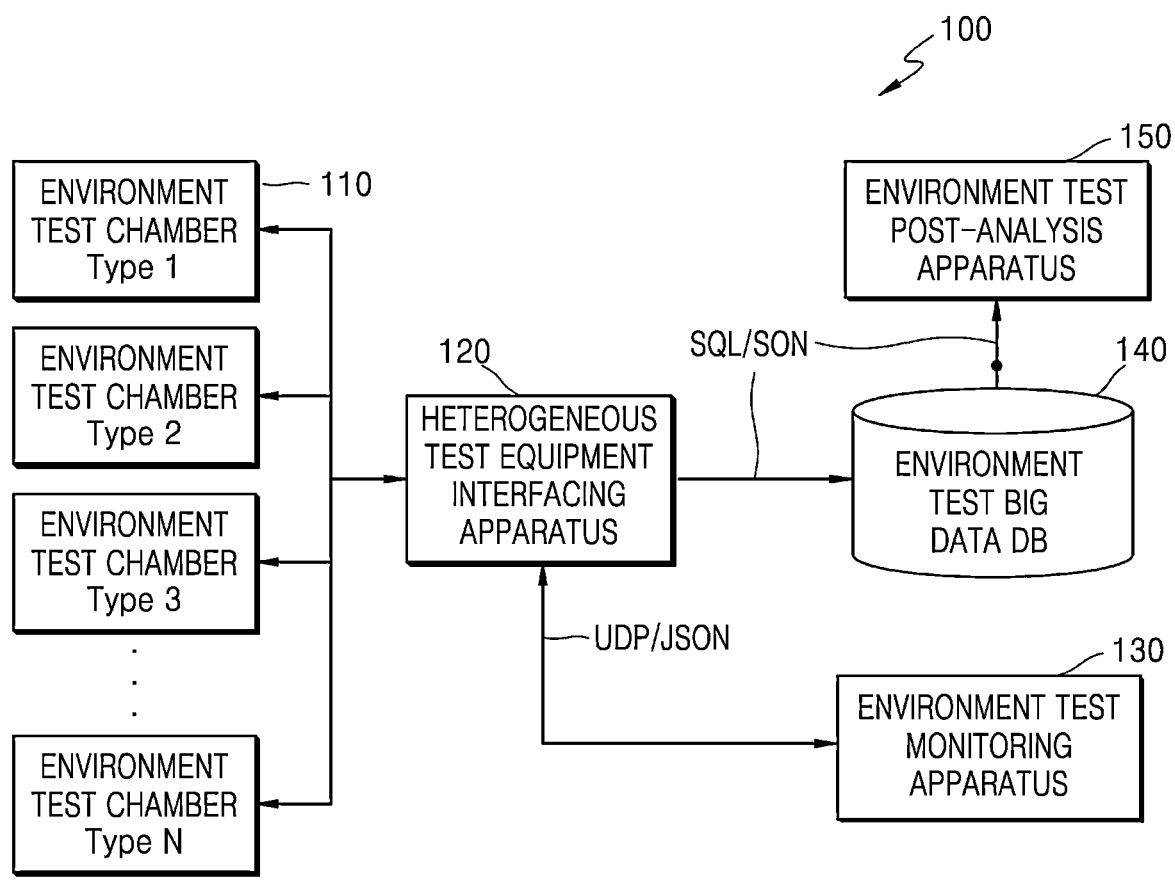
FIG. 1 is a block diagram showing an environment test system according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments of the disclosure will be described in detail with reference to the accompanying drawings. However, since the technical spirit of the present disclosure may be modified into various forms, it is not limited to the embodiments described herein. Detailed description of the related known techniques in description of the embodiments disclosed herein will be omitted when it is determined that the technical spirit of the present disclosure may be obscured thereby. The same or similar elements will be denoted by the same reference numerals and redundant descriptions thereof will be omitted.

Throughout the specification, it will be understood that when a portion is referred to as being "connected to" another portion, it can be "directly connected to" the other portion or "indirectly connected to" the other portion via another element. In addition, unless explicitly described to the contrary, the word "comprise" and variations such as "comprises" or "comprising" will be understood to imply the inclusion of stated elements but not the exclusion of any other elements.

Some embodiments may be described in terms of functional block components and various processing steps. Such functional blocks may be realized by any number of hardware and/or software components configured to perform the specified functions. For example, the functional blocks of the disclosure may be implemented with one or more microprocessors or circuit configurations for certain functions. The functional blocks of the disclosure may be implemented with any programming or scripting language. Functional blocks may be implemented in algorithms that are executed on one or more processors. The functions of a functional block of the present disclosure may be performed by a plurality of functional blocks, or the functions performed by a plurality of functional blocks in the present disclosure may also be performed by one functional block. Furthermore, the disclosure may employ any number of conventional techniques for electronics configuration, signal processing, and/or data processing.

Hereinafter, heterogeneous test equipment interfacing apparatus for testing weapon system environment/stability, an environment test system, and a data intermediate apparatus according to one or more embodiments will be described. An environment test system according to one or more embodiments may include an environment test (control/measurement) central management server that collects and stores environment test measurement data of environment test chambers and serves as a control center for remote controlling the environment test chambers, an integrated operation program for facilitating utilization of data stored in a server and remote control function in a user computer apparatus, and the environment test chambers subject to management and data collection.

Environment test chambers may store data in an environment test central management server or may be remotely controlled through integrated operation management program connected to the server, by using a common interface (Common API).

A common interface may be provided for non-standard equipment unable to provide a common interface (e.g., old environment test chambers) by a heterogeneous test equipment interfacing apparatus including a data intermediate apparatus and a computer apparatus. The heterogeneous test equipment interfacing apparatus may convert non-standard signals into standard common signals. The heterogeneous testing equipment interface device may be designed to have an abstraction structure that may be continuously extended through a facade pattern.

FIG. 1 is a block diagram showing an environment test system according to one or more embodiments.

Referring to FIG. 1, an environment test system 100 includes a plurality of environment test chambers 110, a heterogeneous test equipment interfacing apparatus 120, and an environment test monitoring apparatus 130. The environment test system 100 may include an environment test big data DB 140 and/or an environment test post-analysis apparatus 150.

The environment test chambers 110 may be chambers for testing environment/reliability of a weapon system, for example. The environment test chambers 110 may be developed by various manufacturers with various specifications. At least some of the environment test chambers 110 may be of different types. For example, all of the environment test chambers 110 may be of different types from one another or at least some of the environment test chambers 110 may be of the same type. FIG. 1 shows an example in which N environment test chambers 110 are provided and are of different types from one another.

The environment test chambers 110 of different types may have input/output interfaces different from one another and may receive and output data in different formats. Also, some of the environment test chambers 110 may be analog chambers that data is input and output in the analog manner, whereas the remaining of the environment test chambers 110 may be digital chambers that data is input and output in the digital manner. An analog chamber may be referred to as an old environment test chamber, wherein a state of the old environment test chamber may be output in the form of an electric signal. For example, when an environment test chamber is in an operating state, a high level voltage may be output as state information. On the other hand, when the environment test chamber is in a stopped state, a low level voltage may be output as the state information. As temperature information, an electric signal having a voltage level corresponding to a current chamber temperature may be output. An analog chamber may operate in response to an electric control signal. For example, the analog chamber may start operation in response to a high level electric control signal and may stop operation in response to a low level electric control signal. The electric control signal may be a direct current (DC) voltage signal or an alternating current (AC) voltage signal. A digital chamber may output a chamber state, an environment test result, etc., as a data packet and may receive a control data packet from the outside. A data packet may be transmitted via a wire or wirelessly.

The heterogeneous test equipment interfacing apparatus 120 is an apparatus capable of interfacing inputs and outputs of the environment test chambers 110 of different types in common. For example, different outputs of the environment test chambers 110 of different types may be converted into common data through the heterogeneous test equipment interfacing apparatus 120 and may be provided to the environment test monitoring apparatus 130. Input data from the environment test monitoring apparatus 130 may be converted into input signals or data in formats respectively corresponding to the environment test chambers 110 of different types through the heterogeneous test equipment interfacing apparatus 120 and provided to the corresponding environment test chambers 110. The heterogeneous test equipment interfacing apparatus 120 may include data intermediate apparatuses connected to the environment test chambers 110 and a computer apparatus or a server on which a plurality of commonization daemons connected to the data intermediate apparatuses.

The environment test monitoring apparatus 130 may be configured to monitor different types of outputs output from the environment test chambers 110. Different types of outputs output from the environment test chambers 110 are converted to common output data by the heterogeneous test equipment interfacing apparatus 120, and the environment test monitoring apparatus 130 may monitor different types of outputs output from the environment test chambers 110 through the common output data. The environment test monitoring apparatus 130 may be a computer apparatus for executing an environment test monitoring application.

The environment test big data DB 140 may be configured to store different types of outputs output by the environment test chambers 110. Different types of outputs output from the environment test chambers 110 are converted to common output data by the heterogeneous test equipment interfacing apparatus 120, and the environment test big data DB 140 may store different types of outputs output from the environment test chambers 110 through the common output data. Data stored in the environment test big data DB 140 may be utilized as big data. The environment test big data DB 140 may be a computer apparatus on which a database for storing different types of outputs output by the environment test chambers 110 is executed.

The environment test post-analysis apparatus 150 may be an apparatus for post-analysis of data stored in the environment test big data DB 140. The environment test post-analysis apparatus 150 may be a computer apparatus for executing an environment test post-analysis application.

The environment test monitoring apparatus 130, the environment test big data DB 140, and the environment test post-analysis apparatus 150 may be implemented as different computer apparatuses or may be implemented as a single computer apparatus together.

The heterogeneous test equipment interfacing apparatus 120 may interoperate with the environment test monitoring apparatus 130 by using common data in a JavaScript Object Notation (JSON) format and may transmit common data to the environment test monitoring apparatus 130 through a distribution interface (e.g., Ethernet-UDP Multicast).

The heterogeneous test equipment interfacing apparatus 120 may interoperate with the environment test big data DB 140 and the environment test post-analysis apparatus 150 by using common data in the JSON format and may store common data in the environment test big data DB 140 through a storage interface (e.g., DBMS SQL).

Figure 2:
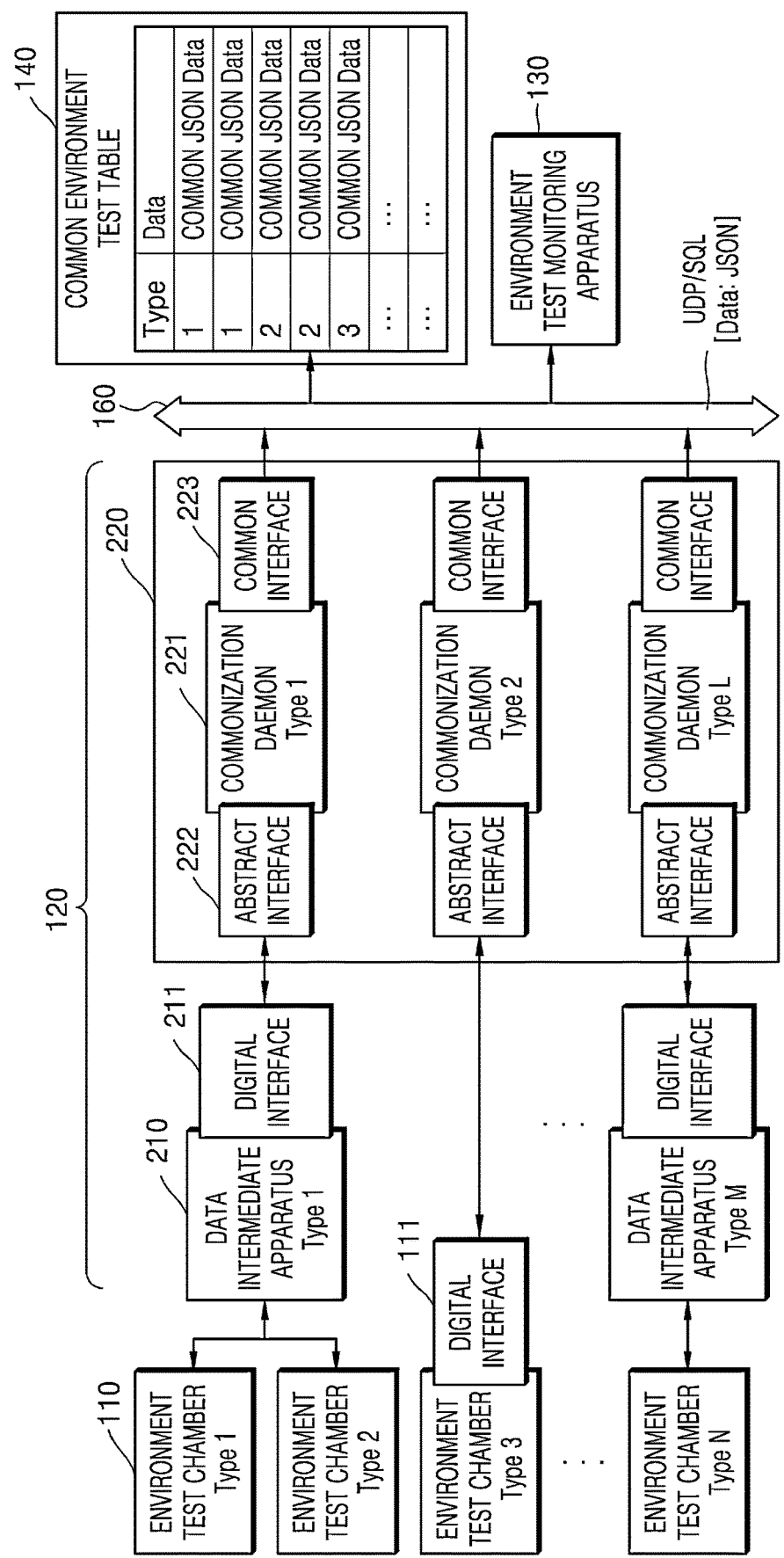
FIG. 2 is a diagram showing the detailed configuration of a heterogeneous test equipment interfacing apparatus according to one or more embodiments.

FIG. 2 is a diagram showing the detailed configuration of a heterogeneous test equipment interfacing apparatus according to one or more embodiments.

Referring to FIGS. 1 and 2 together, the heterogeneous test equipment interfacing apparatus 120 includes a plurality of data intermediate apparatuses 210 and a computer apparatus 220. The computer apparatus 220 may include a plurality of commonization daemons 221, a plurality of abstract interfaces 222, and a plurality of common interfaces 223 respectively corresponding to one another. The plurality of data intermediate apparatuses 210 may each include a digital interface 211 to be connected to a corresponding commonization daemon 221 from among the plurality of commonization daemons 221.

The data intermediate apparatus 210 may collect analog signals from the environment test chambers 110 having an analog interface from among the environment test chambers 110, digitize collected analog signals, and provide a result thereof to a corresponding commonization daemon 221. The data intermediate apparatus 210 may be configured to convert an electric signal received from a corresponding environment test chamber 110 into a data signal based on a simple network management protocol (SNMP) and output the data signal. Also, the data intermediate apparatus 210 may be configured to output a control signal for controlling a corresponding environment test chamber 110 according to an operation control instruction received from the computer apparatus 220. An operation control instruction may be transmitted from the computer apparatus 220 to the data intermediate apparatus 210 according to the SNMP protocol.

According to an embodiment, an analog signal may be a signal having a voltage value or a current value indicating a state of the environment test chamber 110, for example. For example, an analog signal may be a high-level signal or a low-level signal. The state of the environment test chamber 110 may include, for example, an operation state, a normal state, a caution state, a warning state, etc. According to another embodiment, an analog signal may be a signal having a magnitude like a temperature, a voltage, or a current of the environment test chamber 110, for example.

The data intermediate apparatus 210 may receive a control instruction received from the commonization daemon 221, convert the control instruction into an analog signal, and control a corresponding environment test chamber 110. The control instruction may be, for example, an instruction for operating the environment test chamber 110, stopping the environment test chamber 110, or operating or stopping a cooler or a heater. The data intermediate apparatus 210 may output a control signal to perform a control instruction. For example, the control signal may be a voltage signal or a current signal.

The data intermediate apparatus 210 may be connected to one environment test chamber 110. According to another embodiment, one data intermediate apparatus 210 may be connected to two or more environment test chambers 110. The two or more environment test chambers 110 connected to one data intermediate apparatus 210 may be of the same type.

The data intermediate apparatus 210 may include the digital interface 211 for data communication with the computer apparatus 220. The digital interface 211 may provide digital communication between a controller of the data intermediate apparatus 210 and the computer apparatus 220. The digital interface 211 may include network hardware like Ethernet and serial communication and software including protocols (TCP, UDP, etc.).

Some (e.g., an environment test chamber Type 3) of the environment test chambers 110 may have a digital interface 111. The environment test chamber 110 having the digital interface 111 may directly communicate with the computer apparatus 220 without the data intermediate apparatus 210, transmit output data of the environment test chamber 110 to a corresponding commonization daemon 221, directly receive a control instruction from the commonization daemon 221, and directly perform an operation corresponding to the control instruction.

The commonization daemon 221 is a process for commonizing data transmitted/received to/from the digital interface 211 of the data intermediate apparatus 210 and/or the digital interface 111 of the environment test chamber 110 and may be executed on the computer apparatus 220. A structure 1 of the commonization daemon 221 may correspond to a distributed processing structure of the commonization daemon 221. The commonization daemon 221 may be a process executed on an operating system (OS) of the computer apparatus 220. As the environment test system 100 is expanded or according to the performance state of the computer apparatus 220, the commonization daemon 221 may be executed in distributed fashion. A structure 2 of the commonization daemon 221 may correspond to a 1:1 structure between the commonization daemon 221 and digital interfaces 211 and 111. The commonization daemon 221 may have a 1:1 connection structure with the digital interface 111 of the environment test chamber 110 and/or the digital interface 211 of the data intermediate apparatus 210.

The abstract interface 222 may have a software-wise abstracted interface structure, such that the commonization daemon 221 supports heterogeneous digital interfaces. The abstract interface 222 may have interfaces differently implemented for each of the digital interfaces 211 and 111. When a plurality of data intermediate apparatuses 210 having the same digital interface 211 exist, the same commonization daemon 221 is executed as a plurality of processes to cope with expansion of the environment test system 100.

A common interface 223 is a component connected to the commonization daemon 221 without exception and may generate data in a common format for inputs. The format of data generated by the common interface 223 may be the JSON. Common data in the JSON format generated by the common interface 223 may be provided to a bus 160. The common data in the JSON format may be stored in the environment test big data DB 140 through the storage interface (e.g., DBMS SQL) or transmitted to the environment test monitoring apparatus 130 through a distribution interface (e.g., Ethernet-UDP Multicast).

According to an environment test system including a heterogeneous test equipment interfacing apparatus according to one or more embodiments, the commonization daemon 221 has a distributed processing structure. The commonization daemon 221 may be implemented as a process executed on the computer apparatus 220. The computer apparatus 220 may include a single computer apparatus or a plurality of computer apparatuses connected to one another through a network. The commonization daemon 221 may be multiple processes on a single computer or may be executed on a plurality of computers in distributed fashion. Based on whether the environment test system 100 is expanded according to the type of the environment test chamber 110 and performance of the computer apparatus 220 executing the commonization daemons 221, the commonization daemons 221 may be executed in distributed fashion.

Commonization daemons 221 of types respectively corresponding to the types of the digital interfaces 111 and 211 may be executed. The commonization daemons 221 may include a plurality of commonization daemons 221 of different types. Some of the commonization daemons 221 may be operationally coupled to the digital interface 111 of the environment test chamber 110. The remaining of the commonization daemons 221 may be operationally coupled to the digital interface 211 of the data intermediate apparatus 210. In this case, the digital interfaces 211 of the data intermediate apparatuses 210 may transmit data of the environment test chambers 110 to the abstract interfaces 222 of the remaining of the commonization daemons 221.

The commonization daemons 221 and the digital interfaces 111 and 211 are connected one-on-one. Some of the commonization daemons 221 may be connected one-on-one to the digital interfaces 111 of the environment test chambers 110, and the remaining of the commonization daemons 221 may be connected one-on-one to the digital interfaces 211 of the data intermediate apparatuses 210.

An input interface of the commonization daemon 221 may be abstracted software-wise. The abstract interface 222 may constitute the input interface of the commonization daemon 221. The abstract interface 222 may have interfaces differently implemented for the different types of the digital interfaces 211 and 111. The abstract interface 222 may be configured to implement modified interfaces according to heterogeneous digital interfaces.

The common interface 223 may constitute an output interface of the commonization daemon 221. The commonization daemon 221 may generate data received through the abstract interface 222 as common data in the JSON format through the common interface 223. Common data is transmitted to the bus 160 through the storage interface (e.g., DBMS SQL) and the distribution interface (e.g., Ethernet-UDP Multicast).

The common interface 223 may output common data in the JSON format. The common interface 223 may interoperate with the environment test monitoring apparatus 130 through the distribution interface (e.g., Ethernet-UDP Multicast). The common interface 223 may interoperate with the environment test big data DB 140 and the environment test post-analysis apparatus 150 through the storage interface (e.g., DBMS SQL).

The environment test chamber 110 may interoperate with a corresponding data intermediate apparatus 210 according to the type of the environment test chamber 110. According to an embodiment, the environment test chamber 110 may interoperate with the data intermediate apparatus 210 oneon-one. According to another embodiment, a plurality of environment test chambers 110 may interoperate with one data intermediate apparatus 210. For example, the environment test chamber 110 of a first type and the environment test chamber 110 of a second type may interoperate with the data intermediate apparatus 210 of a first type. According to another embodiment, one environment test chamber 110 may interoperate with two or more data intermediate apparatuses 210. As shown in FIG. 2, the environment test chambers 110 of the first type, the second type, and fourth to N-th types may interoperate with the data intermediate apparatuses 210 of first to M-th types. M and N are natural numbers, wherein M and N may be identical to or different from each other.

Figure 3:
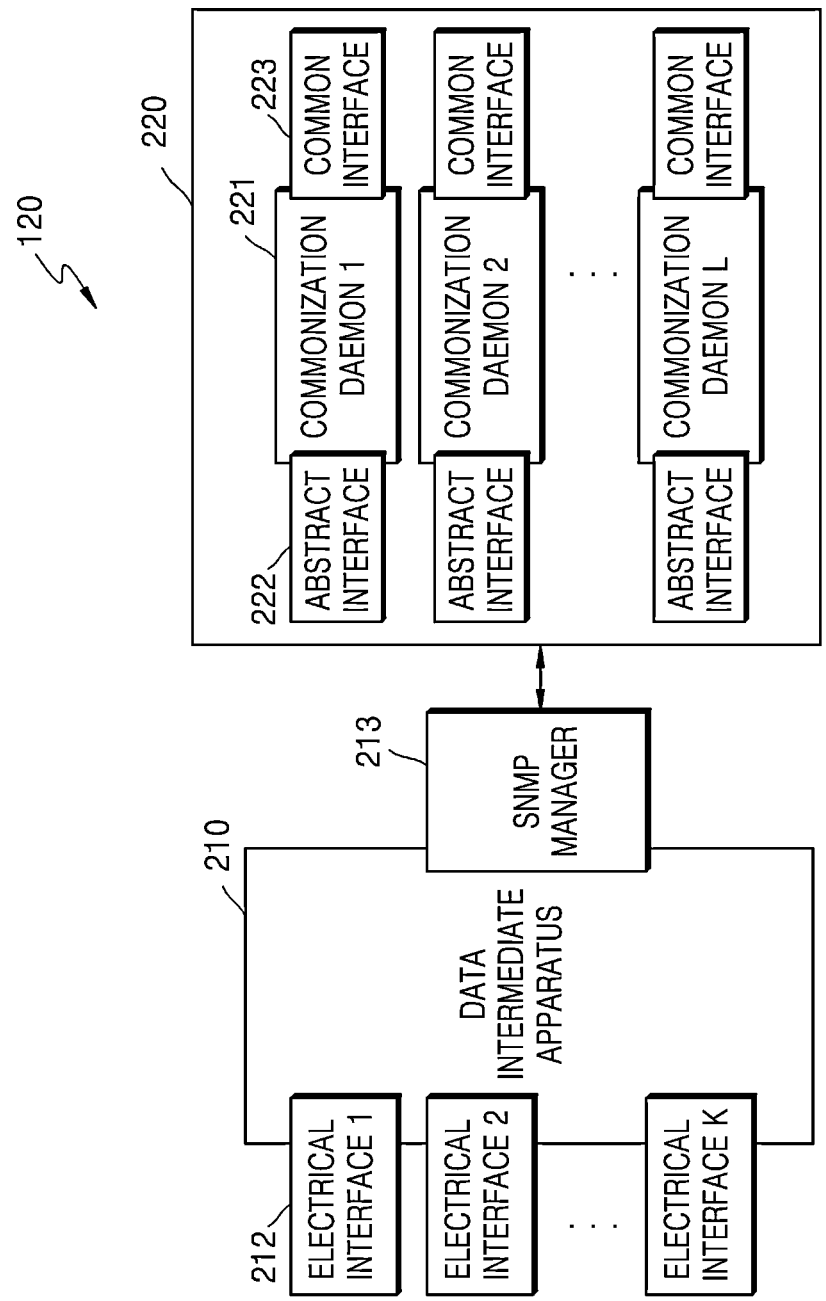
FIG. 3 is a concept diagram of a data intermediate apparatus according to one or more embodiments.

FIG. 3 is a concept diagram of a data intermediate apparatus according to one or more embodiments.

Referring to FIGS. 1 to 3, the heterogeneous test equipment interfacing apparatus 120 includes the data intermediate apparatus 210 and the computer apparatus 220 that executes the commonization daemons 221. The data intermediate apparatus 210 includes an electrical interface 212 and may execute a common SNMP manager 213.

The data intermediate apparatus 210 is an apparatus for converting an electrical interface of the environment test chamber 110, e.g., an old environment test chamber 110 having an analog interface, into a digital interface. The environment test system 100 may digitally control environment of and monitor the old environment test chamber 110 by using the data intermediate apparatus 210. A plurality of data intermediate apparatuses 210 may be provided according to the number and the types of the old environment test chambers 110.

The data intermediate apparatus 210 includes at least one electrical interface 212. The data intermediate apparatus 210 may receive an electric signal output from the old environment test chamber 110 through the electrical interface 212 and process a received electric signal. The electrical interfaces 212 may have characteristics different from one another according to electric signals. To this end, the electrical interfaces 212 may include different types of hardware interfaces. The data intermediate apparatus 210 may control the electrical interfaces 212 to control different types of electric signals.

The number and the purposes of the electrical interfaces 212 may vary according to the old environment test chamber 110 interoperating with the data intermediate apparatus 210. For example, the data intermediate apparatus 210 may include K electrical interfaces 212, and shapes of input/output terminals may vary according to the type of the old environment test chamber 110 interoperating with.

The common SNMP manager 213 may operate as the firmware of the data intermediate apparatus 210. The common SNMP manager 213 is a module serving as a server of the SNMP and complies with a standard protocol implementation method. The data intermediate apparatus 210 may include a micro controller unit (MCU) that executes the common SNMP manager 213. The common SNMP manager 213 may be implemented as firmware operating on the MCU.

The common SNMP manager 213 may operate according to a standardized SNMP, such that the abstract interface 222 of the commonization daemon 221 implements a common interface. The common SNMP manager 213 may convert an electric signal of the old environment test chamber 110 into digital data according to the SNMP to monitor and control the old environment test chamber 110.

The common SNMP manager 213 may operate according to a common management information base (MIB). The common MIB is a definition of data transmission format according to the SNMP and may be defined according to the standard. Meanwhile, codes indicating types and states of objects related to items of the common MIB according to one or more embodiments are exemplified in FIG. 4. FIG. 4 shows program codes indicating types and states of objects related to items of the common MIB based on which the data intermediate apparatus 210 according to one or more embodiments operates.

The abstract interface 222 of the commonization daemon 221 may be implemented as an SNMP agent. The abstract interface 222 may also operate based on the common MIB. In order to cope with an electrical interface that is changed according to the type of the old environment test chamber 110, the commonization daemon 221 may convert data between an SNMP message of the abstract interface 222 and common data of the common interface 223.

In order to interoperate with the old environment test chamber 110 through the data intermediate apparatus 210, the commonization daemon 221 may provide the abstract interface 222. The commonization daemons 221 may each implement an interface complying with the minimum rule and convert the interface into a common interface. Environment test computation data converted into the common interface is input to common computer equipment, e.g., storage in a DB, distribution to applications, etc.

FIG. is a flowchart of a method of interfacing a heterogeneous test equipment interfacing apparatus for testing weapon system environment/reliability according to one or more embodiments.

Figure 5:
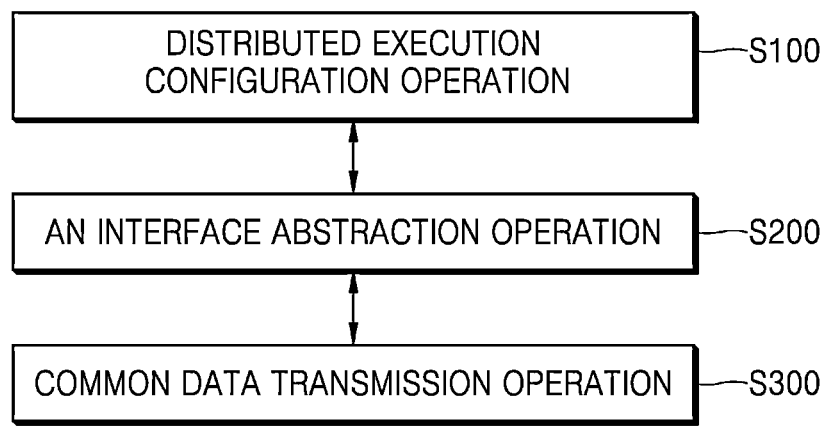
FIG. 5 is a flowchart of a method of interfacing a heterogeneous test equipment interfacing apparatus for testing weapon system environment/reliability according to one or more embodiments.

Referring to FIG. 5, the method of interfacing a heterogeneous test equipment interfacing apparatus for testing weapon system environment/reliability includes a distributed execution configuration operation S100, an interface abstraction operation S200, and common data transmission operation S300.

In the distributed execution configuration operation S100, a commonization daemon may be executed in the distributed fashion by being executed as multiple processes on a single computer or executed on a plurality of computers. Commonization daemons may include a plurality of commonization daemons of different types, and some of the commonization daemons may be operationally coupled to a digital interface of an environment test chamber. The remaining of the commonization daemons may be operationally coupled to a digital interface of a data intermediate apparatus.

In the interface abstraction operation S200, an abstract interface is implemented as an input interface of the commonization daemon, and the abstract interface may implement a modified interface according to heterogeneous digital interfaces. Abstract interfaces of the remaining commonization daemons may receive data of an old environment test chamber through the digital interface of the data intermediate apparatus.

In the common data transmission operation S300, a common interface is implemented as an output interface of the commonization daemon, and the common interface may generate data of an environment test chamber received by the abstract interface as common data in the JSON format. In the common data transmission operation S300, the common data may be transmitted to a storage interface and a distribution interface.

In the common data transmission operation S300, the common interface may interoperate with an environment test big data DB and environment test post-analysis applications by using common data in an SQL/JSON format and store the common data through the storage interface. Also, in the common data transmission operation S300, the common interface may interoperate with environment test monitoring applications by using common data in an UDP/JSON format and transmit the common data through the distribution interface.

Figure 6:
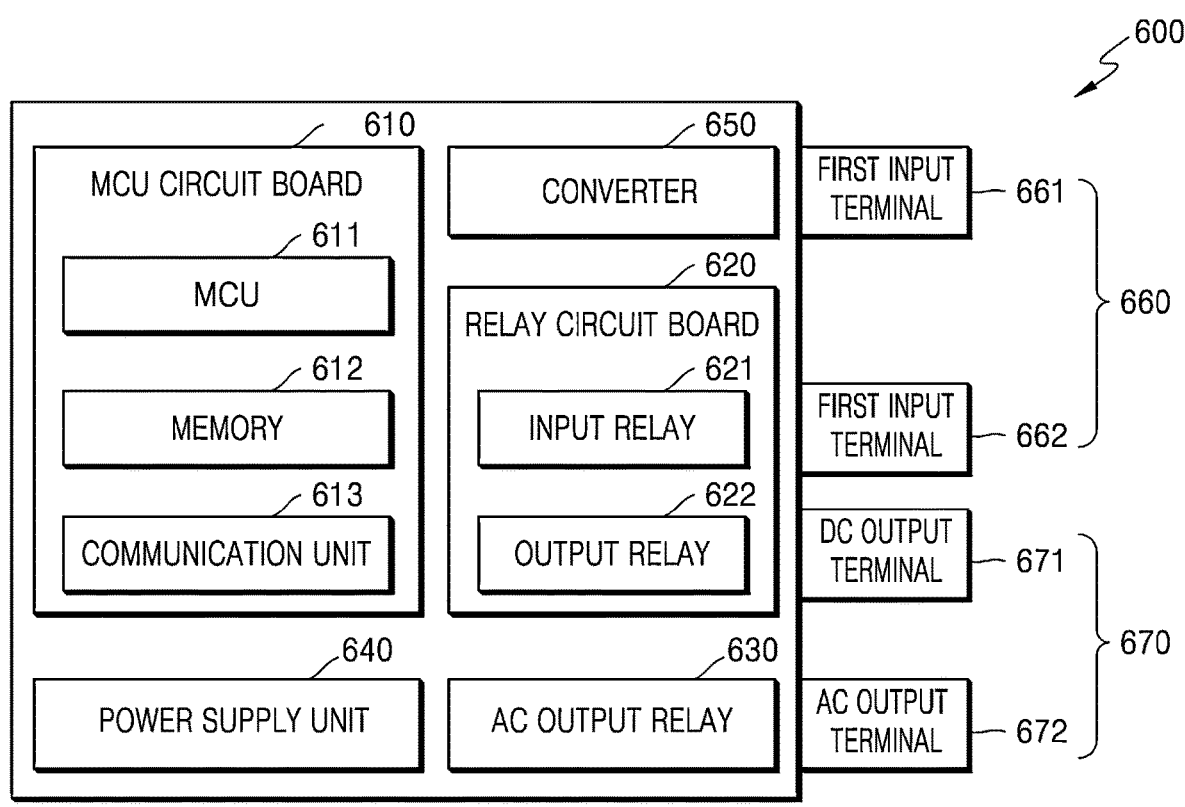
FIG. 6 is a diagram showing a hardware configuration of a data intermediate apparatus according to one or more embodiments.

FIG. 6 is a diagram showing a hardware configuration of a data intermediate apparatus according to one or more embodiments.

Referring to FIG. 6, a data intermediate apparatus 600 includes an MCU circuit board 610, a relay circuit board 620, and a power supply unit 640. The data intermediate apparatus 600 may further include input terminals 660 and output terminals 670.

The input terminals 660 may be connected to the environment test chamber 110. The input terminals 660 may be connected to monitoring points of the environment test chamber 110. The input terminals 660 may include first input terminals 661 through which analog electric signals are received and second input terminal 662 through which digital electric signals are received. The first input terminal 661 receives an analog electric signal having an intensity corresponding to an analog value like a temperature of the environment test chamber 110. The second input terminal 662 receives a high or low level electric signal in correspondence to digital values like operating/stopped state of the environment test chamber 110. The second input terminal 662 may include a 24 Vdc electric signal, for example.

According to another embodiment, the input terminals 660 may be connected to a digital LED-type switch panel. Since ON/OFF of the environment test chamber 110 needs to be remotely controlled, a digital LED-type switch panel may indicate switch ON/OFF by using an LED embedded in a button instead of a conventional analog-type panel. The digital LED-type switch panel may have a plurality of channels, e.g., 12 channels. In this case, the input terminals 660 are DC input terminals and may receive DC states according to operating states (i.e., ON or OFF) of respective switches of the digital LED-type switch panel.

The data intermediate apparatus 600 may further include terminal members providing physical connections between input terminals, output terminals, and internal components (e.g., the relay circuit board 620, a converter 650, and an AC output relay 630).

The relay circuit board 620 may include an input relay 621 and an output relay 622. The relay circuit board 620 may convert electric signals received from the input terminals 660 into control signals used by the MCU circuit board 610 and convert control signals output by the MCU circuit board 610 into electric signals for controlling the environment test chamber 110. The relay circuit board 620 may perform insulation function between the MCU circuit board 610 and the input terminals 660 and the output terminals 670 and protect the MCU circuit board 610 from strong impacts like external surge and lightning. In locations like an industrial site, strong impacts like surge and lighting that may damage the MCU circuit board 610 frequently occurs from the outside the data intermediate apparatus 600, and thus the MCU circuit board 610 may be protected by the relay circuit board 620. The relay circuit board 620 may be separated from the MCU circuit board 610, thereby facilitating maintenance and improving safety.

The input relay 621 may convert electric signals (e.g., 24 Vdc voltage signals) received from the input terminals 660 into control signals (e.g., 3.3 Vdc voltage signals) used by the MCU circuit board 610. The output relay 622 may convert control signals (e.g., 3.3 Vdc voltage signals) output by the MCU circuit board 610 into electric signals (e.g., 24 Vdc voltage signals) for controlling the environment test chamber 110. The input relay 621 and the output relay 622 may electrically insulate an input end and an output end using photo couplers and may protect the MCU circuit board 610 from strong impacts like external surge or lightning.

The MCU circuit board 610 may include an MCU 611, a memory 612, and a communication unit 613. The MCU circuit board 610 may operate the environment test chamber 110 in two modes. The MCU circuit board 610 may receive a control signal from the digital LED-type switch panel and control ON/OFF of electrical control contacts attached to the environment test chamber 110 in response to a received control signal. Also, the MCU circuit board 610 may receive an operation control instruction from a remote location through an Ethernet communication and control ON/OFF of electrical contacts for control attached to the environment test chamber 110 in response to a received operation control instruction. In this case, ON/OFF states of electrical control contacts mounted on the digital LED-type switch panel may be indicated by using LEDs respectively corresponding to the electrical contacts.

The MCU 611 may be configured to process instructions of a computer program by performing basic arithmetic operations, logic operations, and input/output operations. Instructions may be provided to the MCU 611 by the memory 612 or the communication unit 613. For example, the MCU 611 may be configured to execute received instructions according to program codes stored in a storage device like the memory 612. The MCU 611 may receive and process an input signal, output a control signal in response to a control instruction, and control an Ethernet communication. Detailed operations of the MCU 611 will be described below more closely with reference to FIG. 7.

The memory 612 is a computer readable recording medium and may include a random access memory (RAM), a read only memory (ROM), and a permanent mass storage device like a disk drive. Software or firmware for remote controlling and monitoring may be temporarily or permanently stored in the memory 612. Port connection information may be stored in the memory 612 in correspondence to types of the environment test chamber 110 to which the data intermediate apparatus 600 is connected. For example, information indicating a monitoring point of the environment test chamber 110 corresponding to information received through a first input port and information regarding how the environment test chamber 110 to be controlled by an electric signal output from a first output port may be stored in the memory 612.

The communication unit 613 may provide a function for communicating with the computer apparatus 220 through a network. Communication protocols are not limited and may include not only communication protocols utilizing a communication network that may be included in a network (e.g., a mobile communication network, a wired internet, a wireless internet, and a broadcasting network), but also short-distance wireless communications between devices. For example, the network may include any one or more networks from among networks including a personal area network (PAN), a local area network (LAN), a campus area network (CAN), a metropolitan area network (MAN), a wide area network (WAN), a broadband network (BBN), and the Internet. Also, the network may include any one or more from among network topologies including a bus network, a star network, a ring network, a mesh network, a star-bus network, and a tree or hierarchical network, but one or more embodiments are not limited thereto.

The communication unit 613 may communicate with the computer apparatus 220 through a wireless network. Communication protocols therefor are not limited, but the network may be a short-distance wireless communication network. For example, the network may be a Bluetooth network, a Bluetooth low energy (BLE) network, or a Wi-Fi network.

The MCU 611 may output a control signal. The control signal may be converted through the output relay 622 into an electric signal (e.g., a 24 Vdc voltage signal) for controlling the environment test chamber 110. When the environment test chamber 110 is controlled by a DC voltage signal, an electric signal output through the output relay 622 (e.g., a 24 Vdc voltage signal) may be output to a corresponding control point of the environment test chamber 110 through a DC output terminal 671.

The environment test chamber 110 may be controlled by an AC voltage signal. To this end, the data intermediate apparatus 600 may further include the AC output relay 630.

An electric signal output through the output relay 622 (e.g., a 24 Vdc voltage signal) is input to the AC output relay 630, and the AC output relay 630 may convert a DC voltage signal into an AC voltage signal for controlling the environment test chamber 110 (e.g., 220 Vac). The AC voltage signal (e.g., 220 Vac) may be output to a corresponding control point of the environment test chamber 110 through an AC output terminal 672. The AC output terminal 672 may output an AC voltage signal to turn ON/OFF electrical contacts for control attached to the environment test chamber 110. The AC output relay 630 may be an insulation relay and protect the MCU circuit board 610 from strong impacts like external surge by providing insulation for separating external signals and internal signals.

According to another embodiment, the data intermediate apparatus 600 may further include a relay for generating a control signal to directly control the environment test chamber 110. For example, when the environment test chamber 110 is controlled by a 110V DC voltage signal, a relay for converting an electric signal output through the output relay 622 (e.g., a 24 Vdc voltage signal) into a 110V DC voltage signal may be additionally provided.

The data intermediate apparatus 600 may further include the power supply unit 640. The power supply unit 640 may supply power needed for the operation of the data intermediate apparatus 600. For example, the power supply unit 640 may generate or receive, from the outside, power for operating the MCU circuit board 610 (e.g., 3.3 Vdc), power for generating a control signal to be input to the MCU circuit board 610 (e.g., 3.3 Vdc), power for generating a DC voltage signal (e.g., 24 Vdc), and power for generating an AC voltage signal (e.g., 220 Vac) and supply the powers to corresponding circuits. The power supply unit 640 may receive power from the outside, convert the power, and generate necessary power. To this end, the power supply unit 640 may include a converter circuit, an inverter circuit, etc.

The data intermediate apparatus 600 may further include the converter 650. The converter 650 may convert an analog electric signal received through the first input terminal 661 into a voltage signal of a range detectable by the MCU 611. For example, an analog electric signal may be a voltage signal varying between 0V and 24V, and the converter 650 may linearly convert the analog electric signal into a voltage signal varying between 0V and 3.3V, such that the MCU 611 may detect the voltage signal. According to another embodiment, the analog electric signal may be a current signal or may have a resistance value, and the converter 650 may also convert such signals into voltage signals of a range detectable by the MCU 611.

Figure 7:
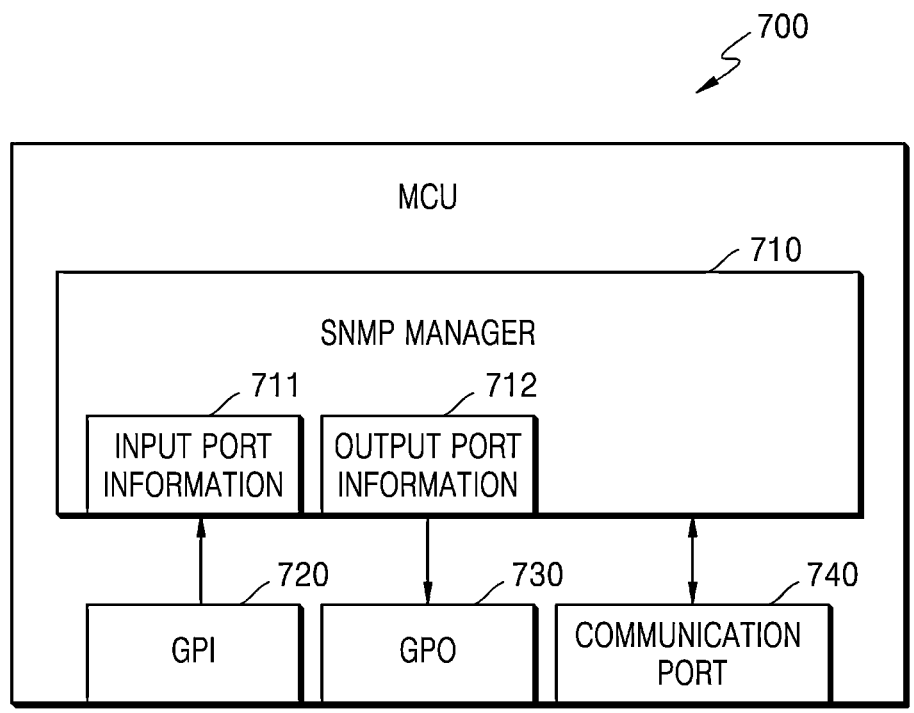
FIG. 7 is a diagram showing the configuration of an MCU of a data intermediate apparatus according to one or more embodiments.

FIG. 7 is a diagram showing the configuration of an MCU of a data intermediate apparatus according to one or more embodiments.

Referring to FIG. 7, an MCU 700 may include an SNMP manager 710, a GPI 720, a GPO 730, and a communication port 740. Functions of the MCU 700 may be implemented by firmware-type software.

The SNMP manager 710 may process a signal received through the GPI 720, convert the signal into a data signal according to the SNMP protocol, and output a converted data signal through the communication port 740. The SNMP manager 710 may output a control signal through the GPO 730 in response to an operation control instruction received through the communication port 740. According to an embodiment, the SNMP manager 710 may monitor hosts on a TCP/IP-based network by regularly collecting state information thereof and, as occasion demand, may implement a standard protocol for remotely controlling the hosts in the form of firmware.

The GPI 720 is an input port for receiving state information from a relay circuit board (620 of FIG. 6). The GPO 730 is an output port for transmitting a control signal to the relay circuit board 620. The communication port 740 is a port for transmitting a data signal to a computer apparatus (e.g., 220 of FIG. 2) and receiving an operation control instruction from the computer apparatus 220. The communication port 740 may be connected to a communication unit (613 of FIG. 6).

The SNMP manager 710 may store input port information 711 and output port information 712 for mapping the GPI 720 and the GPO 730 to monitoring points and control points of an environment test chamber. The input port information 711 may be an OUTLET Get constituting state values for collecting state information from hosts. The output port information 712 may be an OUTLET Set constituting control values transmitted from hosts through control instructions.

Figure 8:
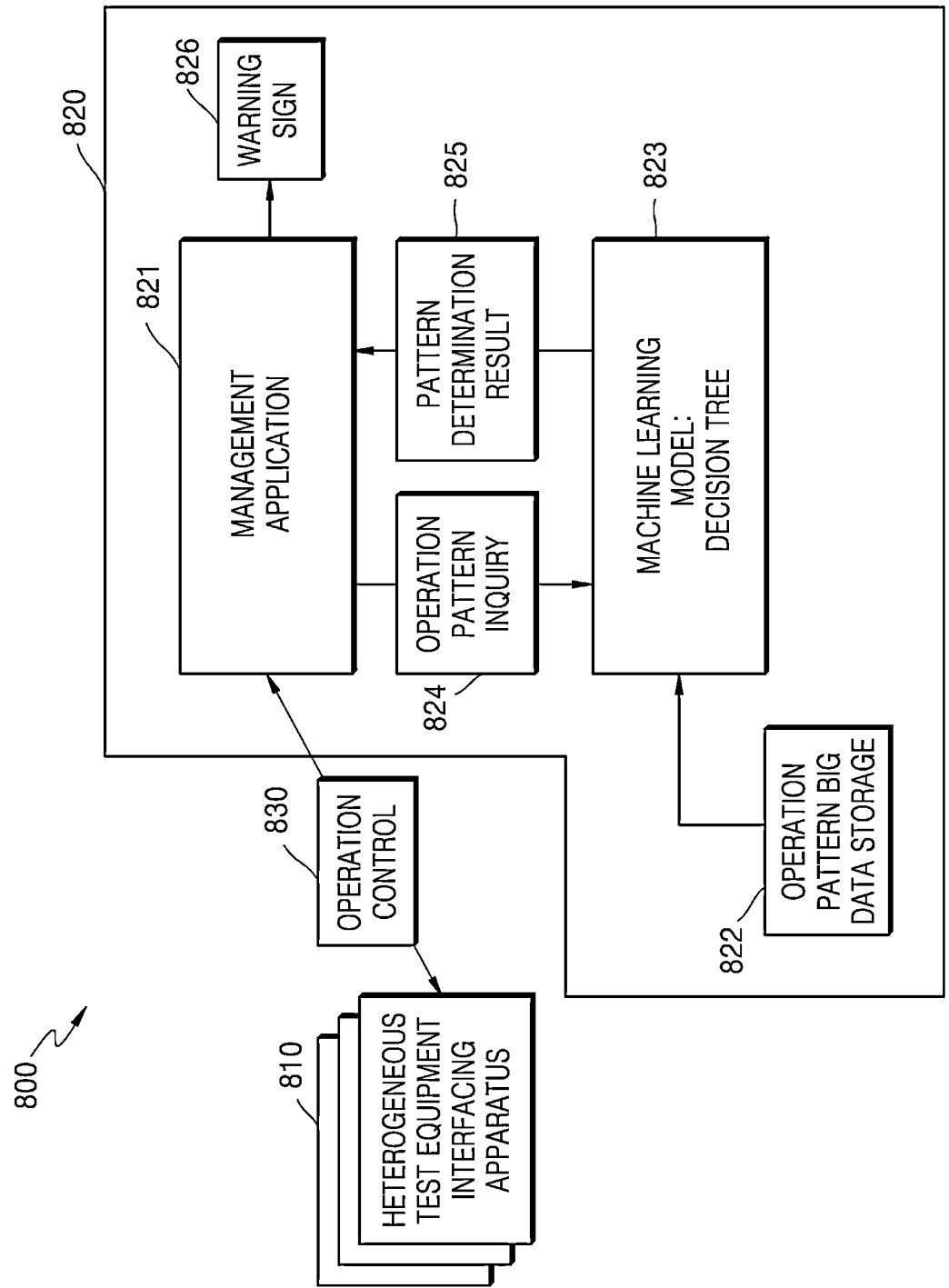
FIG. 8 is a diagram showing the configuration of an environment test system according to another embodiment.

FIG. 8 is a diagram showing the configuration of an environment test system according to another embodiment.

Referring to FIG. 8, an environment test system 800 includes a heterogeneous test equipment interfacing apparatus 810 and an operating computer apparatus 820.

The heterogeneous test equipment interfacing apparatus 810 is substantially equivalent to the heterogeneous test equipment interfacing apparatus 120 shown in FIGS. 1 and 2. The heterogeneous test equipment interfacing apparatus 810 is connected to a plurality of heterogeneous environment test chambers 110.

The operating computer apparatus 820 may be communicably connected to the heterogeneous test equipment interfacing apparatus 810. The operating computer apparatus 820 may include at least one computer apparatus.

The operating computer apparatus 820 may execute a management application 821. The management application 821 may receive an operation control of a user and provide an operation control instruction to the heterogeneous test equipment interfacing apparatus 810 to control the environment test chamber 110 according to the operation control of the user. The management application 821 may be a remote control application for controlling the environment test chambers 110 at a remote location and may be implemented as a window application. The management application 821 may be implemented on any platform as long as a common interface is supported.

An operation control 830 occurs between the heterogeneous test equipment interfacing apparatus 810 and the operating computer apparatus 820, and the operation control 830 may occur due to a manipulation of a user. When a user performs an operation control through a user interface of the management application 821, the operation control 830 may be transmitted from the operating computer apparatus 820 to the heterogeneous test equipment interfacing apparatus 810. When the user performs an operation control through a digital LED-type switch panel of a data intermediate apparatus, the operation control 830 may be transmitted from the heterogeneous test equipment interfacing apparatus 810 to the operating computer apparatus 820. Therefore, the management application 821 may collect operation controls of a user.

The management application 821 may store information regarding operation controls of a user in an operation pattern big data storage 822. The operation pattern big data storage 822 stores operation pattern big data in which actual equipment operation controls of a user are accumulated.

The operating computer apparatus 820 may train a machine learning model 823 by using operation pattern big data stored in the operation pattern big data storage 822. Some of operation pattern big data may be used to train the machine learning model 823, and the remaining of the operation pattern big data may be used to evaluate the machine learning model 823. The machine learning model 823 may be a decision tree model. The machine learning model 823 may be trained to determine whether an operation control of a user corresponds to a normal pattern.

When the operation control 830 is detected, the management application 821 may collect an operation pattern and transmit an operation pattern inquiry 824 to the machine learning model 823. The machine learning model 823 may determine whether an operation pattern included in the operation pattern inquiry 824 corresponds to a normal operation pattern and respond to the management application 821 with a pattern determination result 825.

When the pattern determination result 825 indicating that the corresponding operation pattern is not a normal operation pattern, the management application 821 may display a warning sign 826.

According to another embodiment, the machine learning model 823 may be trained to determine a type of an input operation pattern. The machine learning model 823 may respond the type of the input operation pattern as the pattern determination result 825. When the pattern determination result 825 indicating that an input operation pattern corresponds to a new type, the management application 821 may display the warning sign 826. For example, the management application 821 may have information regarding previously known types of operation patterns. For example, when a pattern type 0 corresponds to an equipment ON pattern and a pattern type 1 corresponds to an equipment OFF pattern and the pattern determination result 825 corresponds to a new unknown pattern type (e.g., a pattern type 2 or a pattern type of greater number), the management application 821 may display the warning sign 826.

The distinctive technical features of a heterogeneous test equipment interfacing apparatus for testing weapon system environment/stability, an environment test system, and a data intermediate apparatus are as follows:

Previous heterogeneous test equipment has unique control/measurement networks and dedicated applications and databases or old equipment write and transmit data in analog ways (e.g., paper printers). Therefore, in order to comprehensively determine results between heterogeneous systems with different interfaces, a lot of time and data reprocessing efforts have been required, and in some cases, it was not possible to reprocess results.

A common interface disclosed in one or more embodiments may use a commonization daemon structure capable of accommodating the extension of multiple test equipment with heterogeneous interfaces to unify interfaces between heterogeneous equipment into a common distribution interface and a common storage interface. Also, the heterogeneous test equipment interfacing apparatus may be designed to collect data of all types of environmental test equipment by converting through a data intermediate apparatus for old equipment without a digital interface. While data of test equipment that may be collected and utilized was previously utilization of a state and a result regarding single equipment, according to one or more embodiments, a common interface may be utilized to converge data of heterogeneous test equipment, thereby utilizing data for overall test evaluation and malfunction prediction of test equipment in common.

One or more embodiments may be applied to a data network between a plurality of heterogeneous equipment. In the case of additionally installing new equipment supporting a networking function in a previously established old system, since old equipment does not support the networking function, it is difficult to establish a network between the old equipment and the new equipment. Also, even when a network is established, a tool for overall management is needed. One or more embodiments may be very effectively applied to a site like a power plant and a large-scale test evaluation facility at which existing infrastructures are continuously upgraded by installing additional facility and equipment without removing the existing infrastructures.

Meanwhile, an environment test system according to one or more embodiments includes a machine learning-based artificial intelligence determination model that does not only control an electrical signal remotely, but also learns operation patterns of test equipment for testing weapon system environment/reliability to prevent a malfunction by giving a warning when a user performs an unusual operation. A user's misoperation of test environment for testing weapon system environment/reliability may be prevented. According to one or more embodiments, by applying a decision tree, which is one of machine learning models, to a management application, the management application may learn operation control patterns of a user and give a warning to the user when an operation control pattern is unusual.

To implement an interface for remote controlling an old environment test chamber using electric signals only, an abstract interface interconnecting a data intermediate apparatus for the old environment test chamber and a commonization daemon operates as an SNMP interface and includes a common interface that generates common data in the JSON format and transmits the common data to a storage interface and a distribution interface. The abstract interface for interoperation with the commonization daemon may operate as an SNMP agent, and the abstract interface and the data intermediate apparatus may interoperate with each other through an SNMP manager and a common MIB.

The data intermediate apparatus is used to monitor and control an electrical interface of an old environment test chamber. The data intermediate apparatus includes a relay circuit board including photo-couplers for controlling DC inputs/AC outputs and an MCU circuit board for actually implementing remote connection software. The MCU circuit board may communicate with a management application according to a standard protocol through an SNMP interface.

The management application may remotely record and manage all operations controls of a user. According to one or more embodiments, a decision tree, which is a machine learning algorithm (artificial intelligence), learns a pattern of a user by using accumulated operation control data, and the machine learning algorithm (artificial intelligence) may classify an operation pattern of a user. When an operation pattern other than operation patterns defined and learned as "normal operations" based on training data is detected by the artificial intelligence, the management application may display a warning sign indicating that an unusual pattern is found.

According to one or more embodiments, a common interface (CI) may be provided to unify different outputs (heterogeneous data) of heterogeneous environment test chambers into big data having the same structure. By using the CI, management systems and databases that are managed independently for each manufacturer and equipment may be commonized, thereby integrally managing environment test chambers of different types. Common databases and common data that are integrally managed facilitate converging determination of results between heterogeneous test equipment and may be used as big data for preventive maintenance of test equipment and determination of test malfunction.

According to one or more embodiments, weapon system environment test equipment may be operated in different ways, at different locations, and by different personnel due to wide installation ranges and various routes and times of acquisition. Computerization management and backup may be performed according to characteristics and times of acquisition of respective environment test chambers. Efficiency of data utilization including collection, analysis, and backup of environment test results may be improved.

According to one or more embodiments, a system capable of recording and managing environment test results of various environment test chambers for convenience of data utilization and conveniently utilizing the environment test results may be provided. Also, by configuring a system to be capable of assisting a user by determining whether the user is operating an environment test chamber normally by using a machine learning-based artificial intelligence, risks of negligent accidents and test failure may be reduced and operation-related records may be managed by using a computer.

Various embodiments described herein are exemplary and are not necessarily to be performed independently from one another. The embodiments described herein may be implemented in combination with one another.

Various embodiments described above may be implemented in the form of a computer program that may be executed through various components on a computer, and such a computer program may be written to a computer-readable medium. At this time, the medium may continue to store programs executable on a computer or temporarily store the programs for execution or download. Also, the medium may be a variety of recording means or storage means in which a single or several hardware is combined, and, without being limited to a medium connected directly to a computer system, may be dispersed on a network. Examples of the medium may include a magnetic medium like a hard disk, a floppy disk, and a magnetic tape, an optical recording medium like a CD-ROM and a DVD, a magneto-optical medium like a floptical disk, a ROM, a RAM, and a flash memory, etc, wherein the medium may be configured to store program instructions. Examples of other media may include recording media or storage media managed in an app store that distributes applications or a site or a server that distributes various other software.

In this specification, a "unit" or a "module" may be a hardware component such as a processor or a circuit, and/or software component executed on the hardware like a processor. For example, a "unit" or a "module" may be implemented by components like software components, object-oriented software components, class components, and task components, processes, functions, properties, Procedures, subroutines, segments of program codes, drivers, firmware, micro codes, circuits, data, databases, data structures, tables, arrays, and variables.

The above descriptions of one or more embodiments given above are merely illustrative, and one or ordinary skill in the art to which one or more embodiments belong would understand that one or more embodiments may be easily modified in different concrete forms without changing the technical spirit or essential features of the one or more embodiments. Therefore, the embodiments described above should be understood that they are illustrative in all respects and are not limited. For example, components each described as an individual type may be implemented in a dispersed form, and components described that they are being dispersed may be implemented in a combined form.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A heterogeneous test equipment interfacing apparatus comprising:
   a plurality of data intermediate apparatuses connected to a plurality of environment test chambers, wherein each of the plurality of data intermediate apparatuses converts an electric signal received from at least one environment test chamber interoperating with a corresponding data intermediate apparatus from among the plurality of environment test chambers into a data signal based on a Simple Network Management Protocol (SNMP) and output the data signal; and
   at least one computer apparatus interoperating with the plurality of data intermediate apparatuses,
   wherein each of the plurality of data intermediate apparatuses outputs a control signal for controlling the at least one environment test chamber interoperating with a corresponding data intermediate apparatus according to an operation control instruction received from the at least one computer apparatus,
   wherein the at least one computer apparatus executes:
   a plurality of commonization daemons, which are executable as a single process on a single computer or executable on multiple computers in correspondence to the plurality of data intermediate apparatuses;
   an abstract interface implementing an input interface of a corresponding commonization daemon from among the plurality of commonization daemons to receive the data signal from a corresponding data intermediate apparatus from among the plurality of data intermediate apparatuses and to implement a modified interface according to heterogeneous digital interfaces; and a common interface implementing an output interface of a commonization daemon from among the plurality of commonization daemons, generating chamber data of the environment test chamber according to the data signal received from the abstract interface as common data in a JavaScript Object Notation (JSON) format, and transmitting the common data to a storage interface and a distribution interface.

2. The heterogeneous test equipment interfacing apparatus of claim 1,
wherein the common interface
determines whether the common data is first common data in an Structured Query Language (SQL)/JSON format or second common data in an User Datagram Protocol (UDP)/JSON format,
by interoperating with an environment test big data DataBase (DB) and an environment test post-analysis application by using the first common data in the SQL/JSON format, stores the first common data in the environment test big data DB through the storage interface, and,
by interoperating with environment test monitoring applications by using the second common data in the UDP/JSON format, transmits the second common data to the environment test monitoring application.

3. The heterogeneous test equipment interfacing apparatus of claim 1, wherein the plurality of environment test chambers connected to the plurality of data intermediate apparatuses are weapon system environment test chambers having analog interfaces, and at least some of the environment test chambers are of different types.

4. The heterogeneous test equipment interfacing apparatus of claim 3, wherein at least some of the plurality of commonization daemons are of different types in correspondence to the plurality of environment test chambers.

5. The heterogeneous test equipment interfacing apparatus of claim 4, wherein some of the plurality of commonization daemons are directly coupled to the environment test chambers through digital interfaces without a data intermediate apparatus.

6. The heterogeneous test equipment interfacing apparatus of claim 1, wherein each of the data intermediate apparatuses comprises:
a plurality of input terminals connected to the at least one environment test chamber interoperating with;
a plurality of input relays converting electric signals received from the plurality of input terminals into signals of a pre-set voltage level;
a Micro Controller Unit (MCU) converting the signals of the pre-set voltage level into the data signal based on the SNMP protocol; and
a communication unit outputting the data signal.

7. The heterogeneous test equipment interfacing apparatus of claim 6, wherein each of the data intermediate apparatuses comprises:
a plurality of output relays converting a control signal output from the MCU into a direct current (DC) control signal; and
a plurality of output terminals outputting the DC control signal to the at least one environment test chamber interoperating with.

8. The heterogeneous test equipment interfacing apparatus of claim 7, wherein each of the data intermediate apparatuses further comprises
an alternating current (AC) output relay converting the DC control signal into an AC control signal,
wherein the AC control signal is output to the at least one environment test chamber interoperating with through the plurality of output terminals.

9. The heterogeneous test equipment interfacing apparatus of claim 7, wherein the MCU comprises General Purpose Inputs (GPIs) and General Purpose Outputs (GPOs) respectively corresponding to the plurality of input terminals and the plurality of output terminals and stores input port information and output port information for mapping the GPIs and the GPOs to points of the at least one environment test chamber interoperating with.

10. The heterogeneous test equipment interfacing apparatus of claim 6, wherein the MCU executes an SNMP manager based on a common Management Information Base (MIB).

11. An environment test system comprising:
a plurality of environment test chambers, wherein at least some of the plurality of environment test chambers are of different types;
a heterogeneous test equipment interfacing apparatus of claim 1 connected to the plurality of environment test chambers; and
an operating computer apparatus receiving an operation control of a user and, according to the operation control of the user, execute a management application providing operation control instructions to the heterogeneous test equipment interfacing apparatus to control the plurality of environment test chambers.

12. The environment test system of claim 11, wherein the operating computer apparatus comprises:
an operation pattern big data storage storing operation control data in which operation controls received from the user are recorded; and
a machine learning model trained to determine whether an operation control of the user corresponds to a normal pattern by using the operation control data.

13. The environment test system of claim 12, wherein the management application inquires an operation control of the user to the machine learning model, receive pattern information from the machine learning model, and, when the pattern information indicates an abnormal pattern, output a warning sign.

14. The environment test system of claim 12, wherein the machine learning model is a decision tree model.

* * * * *